United States Patent [19]

Baldwin et al.

[11] Patent Number: 5,069,501
[45] Date of Patent: Dec. 3, 1991

[54] SPOILER SUNROOF CONTROL MECHANISM

[75] Inventors: David P. Baldwin, Romeo, Mich.; Stephanus F. Du Toit, Pretoria, South Africa; Jose A. Mirkin, West Bloomfield, Mich.

[73] Assignee: General Motors Corporation, Detroit, Mich.

[21] Appl. No.: 562,086

[22] Filed: Aug. 3, 1990

[51] Int. Cl.[5] .............................................. B60J 7/047
[52] U.S. Cl. ................................... 296/223; 296/220; 296/221; 296/222
[58] Field of Search ......................... 296/216, 220-224

[56] References Cited

U.S. PATENT DOCUMENTS 4,602,815 7/1986 Boots et al. ........................ 296/222

FOREIGN PATENT DOCUMENTS 3640168 6/1987 Fed. Rep. of Germany ...... 296/216

Primary Examiner—Dennis H. Pedder
Attorney, Agent, or Firm—Charles E. Leahy

[57] ABSTRACT

A control assembly moves a sunroof panel between a closed position sealing an opening in a vehicle roof, a tilted open position with one end of the sunroof panel disposed at a different elevation with respect to the other to form a spoiler and a fully opened position wherein the sunroof panel is substantially parallel to the vehicle roof. A drive member is slideably moveable along a guide member between predetermined positions and includes a pair of drive cam surfaces. A panel orientating member is fixedly disposed with respect to the guide member and includes a pair of cam orientating surfaces. A control arm is connected to the sunroof panel includes a pair of cam followers operatively and fixedly secured thereto in spaced relationship with respect to each other and slideably and movably supported along the orientating slots as well as the drive slots such that movement of the drive member moves the cam followers along the drive cam surfaces and drives the cam followers along the orientating cam surfaces such that the position of the cam followers and thus the control arm with respect to the orientating cam surfaces of the orientating member defines the position of the sunroof panel between its closed, tilted open and fully opened positions for any given position of the drive member.

4 Claims, 3 Drawing Sheets

SPOILER SUNROOF CONTROL MECHANISM

BACKGROUND OF THE INVENTION

(1) Technical Field

The subject invention relates to a control assembly for moving a closure, such as a sunroof panel of a vehicle, between a closed position, a tilted open position to form a spoiler and a fully open position.

(2) Description or The Prior Art

Spoiler type sunroof control assemblies are known in the prior art for controlling the movements of a vehicle sunroof between a closed position with respect to the opening in the roof of the vehicle, a tilted opened position wherein the rearward end of the sunroof panel is disposed in a position above the forward end of the panel to form a spoiler and a fully opened position wherein the panel is disposed in a plane which is substantially parallel to the roof of the vehicle. Examples of control assemblies for spoiler type sunroofs can be found in U.S. Pat. No. 4,647,106 issued to Furst on Mar. 3, 1987 directed toward a lifting/sliding roof for vehicles; U.S. Pat. No. 4,624,501 issued to Niwa et al on Nov. 25, 1986 and directed toward a sliding roof device for automobiles; U.S. Pat. No. 4,630,860 issued to Fuerst et al on Dec. 23, 1986 directed toward a vehicle roof cover and wind deflector and British Patent No. 2068304 B issued to Blankenburg et al published on June 22, 1983 and directed toward a sliding roof for an automobile.

Sunroof control assemblies of the prior art generally include complex kinematic arrangements having multiple links, cams and pivot points all interrelating to move a sunroof panel between a closed position, a tilted open or vented position and a fully opened position. These assemblies are complex, cumbersome and relatively expensive and severely crowd the limited space between the double wall construction of the roof of a vehicle making installation and maintenance difficult.

The subject invention overcomes all of these deficiencies in the prior art in a kinematically efficient, relatively simple and versatile control assembly for a spoiler type sunroof.

SUMMARY OF THE INVENTION AND ADVANTAGES

The subject invention is directed toward a control assembly for moving a closure, such as a sunroof panel, between a closed position, a tilted open position and a fully opened position. The assembly includes a drive means movable between predetermined positions, orientating means and an object, such as a control arm, which is operatively connected to a sunroof panel. The control am is movable between at least two predetermined positions and includes first and second means for interconnecting the control arm with the drive means and the orientating means. These first and second means are operatively and fixedly secured to the control arm and are in spaced relationship with respect to each other such that movement of the drive means relative to the orientating means moves the control arm and thus the sunroof panel between its closed, tilted open and fully opened positions.

Accordingly, this invention overcomes the problems of the prior art by including a control assembly for moving a closure, such as a sunroof panel, between at least two predetermined positions and which includes a control arm which is operatively interconnected with a drive means and an orientating means at two points represented by the first and second means of the control arm. The first and second means interconnect the control arm with the drive means and the orientating means such that the movement of the drive means relative to the orientating means moves the control arm and thus orientates the sunroof panel between any predetermined positions. In this way, the subject invention precludes the use of complex kinematic mechanisms to obtain the desired movement of the sunroof panel and, instead, employs a unique interconnection between the control arm and a drive means and a orientating means at only two points to define the movement of the control arm and thus the sunroof panel. Further, the desired results are accomplished in an assembly with very few moving parts, which is easily manufactured in less time than is required for the assemblies of the prior art and at a significant cost reduction.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
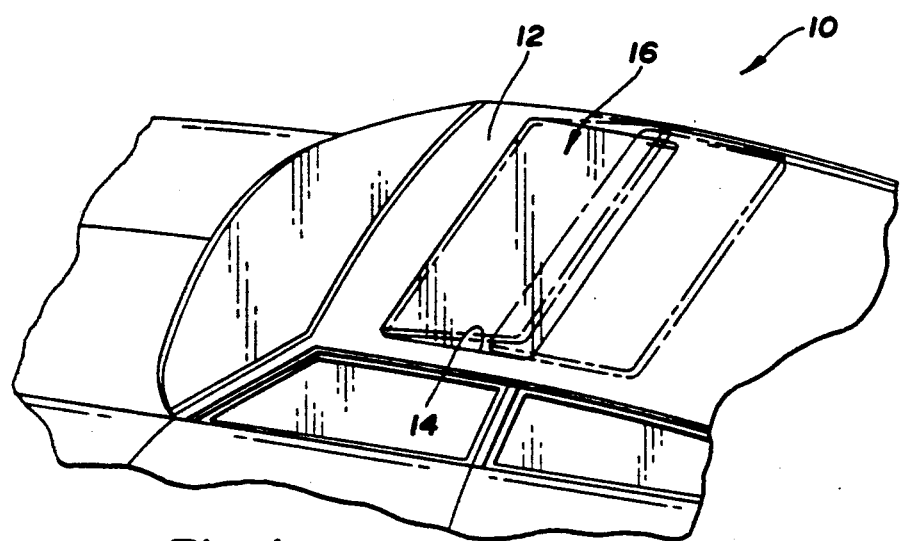
FIG. 1 is a partial, perspective view of a vehicle roof having an spoiler sunroof control assembly of the subject invention.

A vehicle, generally shown at 10 having a roof II with a generally rectangular opening 14 disposed therein is depicted in FIG. I. A sunroof, generally indicated at 16, is movably disposed between multiple positions in the opening 14 as will be described hereinafter. The sunroof 16 has a closed position flush with the opening 14 in the roof II and located at its forwardmost position with respect to the vehicle 10. As shown in phantom in FIG. I, the sunroof 16 has a tilted open position wherein the rearwardmost end of the sunroof 16 relative to the vehicle 10 is disposed at an elevation above the forwardmost end of the sunroof 16 to form, in effect, a spoiler. The sunroof 16 is adapted, in the spoiler type position, to expose only a small portion of the opening 14, or it may be movable to a point where almost the entire opening 14 is exposed. Additionally, the sunroof 16 may be moved to a fully open position, shown in phantom in FIGS. 1 and 6, wherein the sunroof 16 is substantially parallel to the roof 12 of the vehicle 10.

Figure 2:
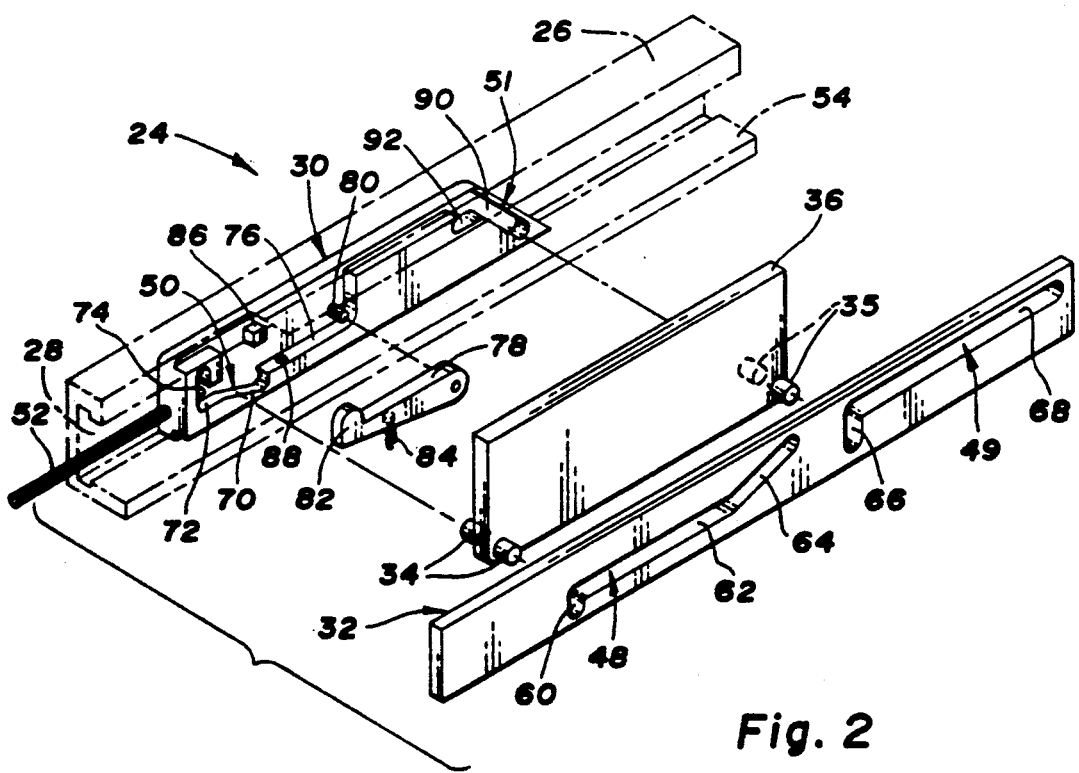
FIG. 2 is an exploded view of the control assembly of the subject invention.

Referring now to FIG. 2, there is shown generally at 24, a control assembly for moving an object, such as a sunroof 16, between at least two predetermined positions. More specifically, in the application illustrated in the preferred embodiment, i.e. moving a sunroof, there are two control assemblies 24 mounted to the vehicle 10 at opposite sides of the opening 14. The control assemblies 24 are mirror images of one another so they are substantially the same in operation and construction with modification to fit the right and left side of the opening. Accordingly, the structure and operation of only one of the control assemblies 24 will be discussed in detail below.

The control assembly 24 includes a guide means 26 for establishing a predetermined guide path 28. A drive means, generally indicated at 30, is slideably movable along the guide path 28 and movable between predetermined positions. The guide path 28 is a channel shaped member which constrains the movement of the drive means 30 axially along the path 28. The control assembly 24 further includes a panel orientating means, generally indicated at 32, which is fixedly disposed with respect to the guide means 26 for establishing the orientation of a panel, such as sunroof 16. The sunroof 16 is adapted to be moved between at least two predetermined positions and includes first and second means 34, 35 respectively for interconnecting the sunroof 16 with the drive means 30 and the orientating means 32. The first and second means 34 and 35 are operatively and fixedly secured to the sunroof 16 in spaced relationship with respect to each other such that movement of the drive means 30 relative to the orientating means 32 moves the sunroof 16 between the predetermined positions. Further, the positions of the first and second means 34 and 35 relative to the orientating means 32 defines the position of sunroof 16 for any given position of the drive means 30. In addition, and as eluded to above, the orientating means 32 is fixed such that movement of the drive means 30 relative to the orientating means 32 moves the sunroof 16 between the predetermined positions as will be discussed in further detail below.

Figure 4:
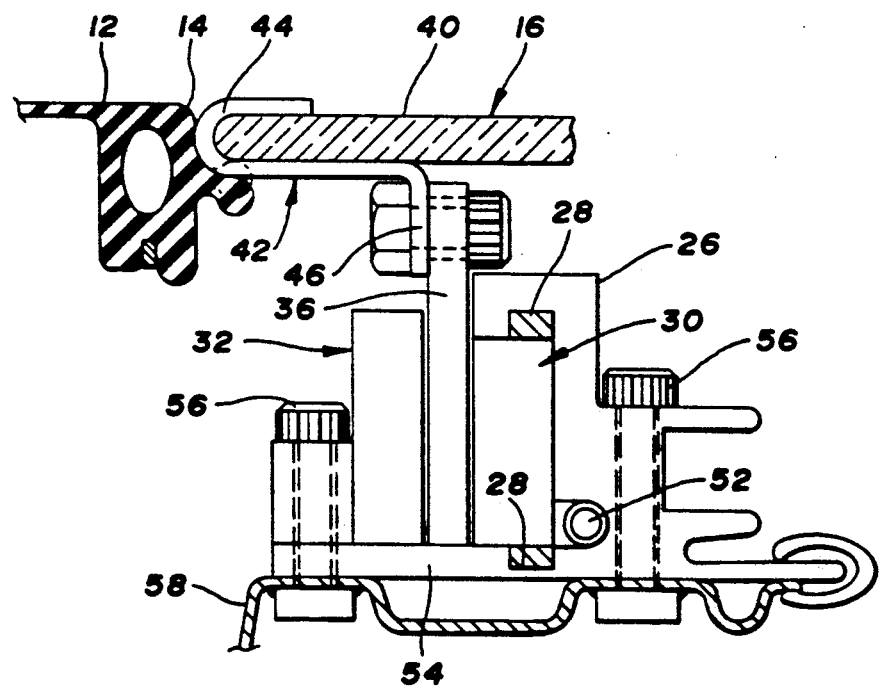
FIG. 4 is a cross-sectional side view of the control assembly for the left side of the sunroof panel as viewed from the front of a vehicle.

The sunroof 16 includes a sunroof panel 40 and a control arm 36. The control arm 36 is an integral plate-like element substantially rectangular in shape so as to define a plane. The control arm 36 is operatively connected to and supports the sunroof panel 40 via a mounting bracket, generally indicated at 42. The mounting bracket 42 includes a curved portion 44 which wraps around the edge of the sunroof panel 40 and a flange portion 46 which is fixedly secured to the control arm 36 by any conventional fastening means such as a bolt and nut arrangement as shown in FIG. 4. In this way, the mounting bracket 42 securely supports the sunroof panel 40 with respect to the control arm 36.

The first and second means 34, 35 respectively include a cam following means 34, 35 which are fixedly secured to the control arm 36 in spaced relationship with respect to each other for operatively interconnecting the control arm 36 with the drive means 30 and the orientating means 32. More specifically, the cam followers 34, 35 are a pair of cylindrical pins. The pins 34, 35 extend substantially perpendicularly through the plane of the control arm 36 at two points.

The orientating means 32 is a rectangular plate like orientating member which is fixed relative to the guide means 26. The orientating means 32 includes means defining a pair of orientating cam surfaces, generally indicated at 48 and 49 respectively. The orientating cam surfaces are a pair of orientating slots 48, 49 spaced with respect to each other. The orientating slot 48 of the orientating member 32 includes a vertical slot portion 60 and a horizontal slot portion 62 extending parallel to the longitudinal axis of the rectangular orientating member 32 and perpendicular to the vertical slot portion 60. The horizontal slot portion 62 terminates in an elevating slot portion 64 which forms an obtuse angle with the horizontal slot portion 62.

The orientating slot 49 of the orientating member 32 also includes a vertical slot portion 66 and a horizontal slot portion 68 extending parallel to the longitudinal axis of the rectangular orientating member and perpendicular to the vertical slot portion 66.

The drive means is a shuttle-like drive member 30 which is slideably disposed in the channel of the guide path 28 and movable along the axis of the channel between predetermined positions. The drive mean 30 includes means defining a pair of drive cam surfaces, generally indicated at 50 and 51 respectively. The drive cam surfaces are a pair of drive slots 50, 51 also spaced with respect to each other.

The drive slot 50 includes a riser slot portion 70, a land slot portion 72 extending parallel to the direction of movement of the drive member 30 and a vertical slot portion 74 extending perpendicular to the land slot portion 72. The drive member 30 also includes a recess 76. A stop member 78 is pivotally supported at one end about a pivot point 80 in the recess 76. The stop member 78 includes a head 82 disposed opposite the pivot point 80. A biasing means 84 is employed to bias the stop member 78 upward into abutting contact with block 86. The biasing means includes a coiled spring 84 disposed between the stop member 78 and the recess 76 of the drive member 30.

The channel of the guide path 28 presents an abutment surface 88 which drives the head 82 of the stop member 78 downwardly against the biasing force of the spring 84 to block the riser slot portion 70 of the drive slot 50 as will be described in further detail below.

The drive slot 51 includes an elevator slot portion 90 and a land slot portion 92 extending parallel to the direction of movement of the drive member 30.

The cam followers 34, 35 are slideably and movably supported along the pair of orientating slots 48, 49 and the pair of drive slots 50, 51 such that movement of the drive means 30 moves the cam followers 34, 35 along the drive slots 50, 51 and drives the cam followers 34, 35 along the orientating slots 48, 49 such that the position of the cam followers 34, 35 with respect to the orientating slots 48, 49 of the orientating means 32 defines the position of the sunroof panel 40 for any given position of the drive means 30. In this way, complex kinematic mechanisms including links and pivot points are eliminated from the control assembly of the subject invention.

Referring now to FIG. 4, and as illustrated to above, the guide path 28 of the guide means 26 defines a channel having a substantially U-shaped configuration. The drive means 30 is slideably disposed in the channel and movable along the axis of the channel between the predetermined positions. A motion transmitting device such as a stiff helical cable 52 is operatively connected at one end to the drive means 30 and is operatively connected at its opposite end to an electrical motor or the like (not shown) for driving the drive means 30. The guide means 26 further includes a base portion 54 extending horizontally from the channel of the guide path 28 to present a platform on which the orientating means 30 and thus the control arm 36 are ultimately supported.

The drive means 30, the orientating means 32 and the control arm 36 are all disposed adjacent to one another on the guide means 26. The guide means 26 is, in turn, fixedly secured by any conventional means such as fasteners 56 to a support member 58. The support member 58 is operatively connected to the roof 12 of the vehicle 10 and supports the control assembly 24 and thus the sunroof panel adjacent the opening 14 in the roof 12 in such a way so as to enable the sunroof to open and close the opening 14.

Figure 3:
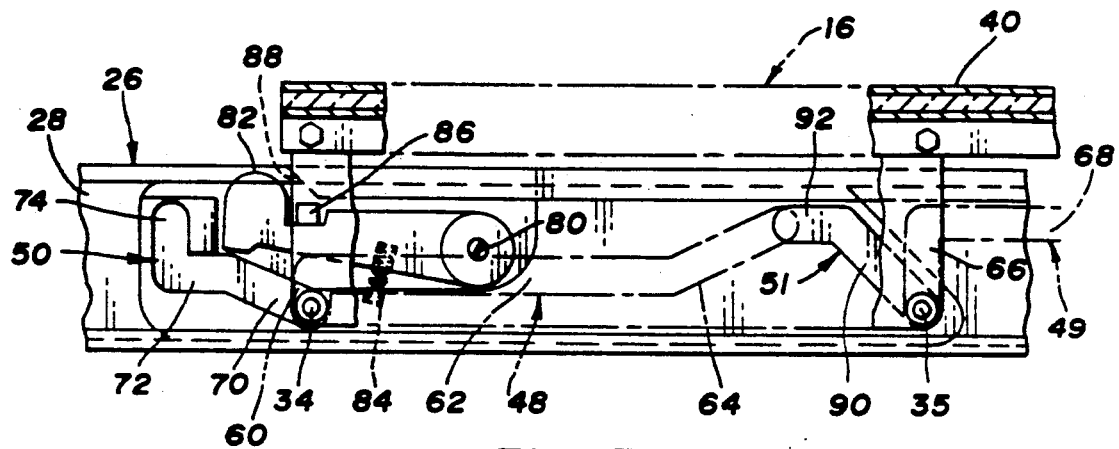
FIG. 3 is a partial side view of the control assembly with the sunroof panel disposed in a closed position.

The control assembly 24 of the subject invention operates in the following manner. Referring to FIGS. 3 and 4, the control assembly 24 is disposed with the sunroof 16 in the closed position. At this position, the sunroof 16 is flush with the opening 14 of the roof 16. The cam following pin 34 is disposed at rest in the bottom of the vertical slot portion 60 of the orientating slot 48 and at the terminal end of the riser slot portion 70 of the drive slot 50. Similarly, the cam following pin 35 is disposed at rest at the bottom of the vertical slot portion 66 of the orientating slot 49 and the bottom of the elevator slot portion 90 of the drive slot 51.

Figure 5:
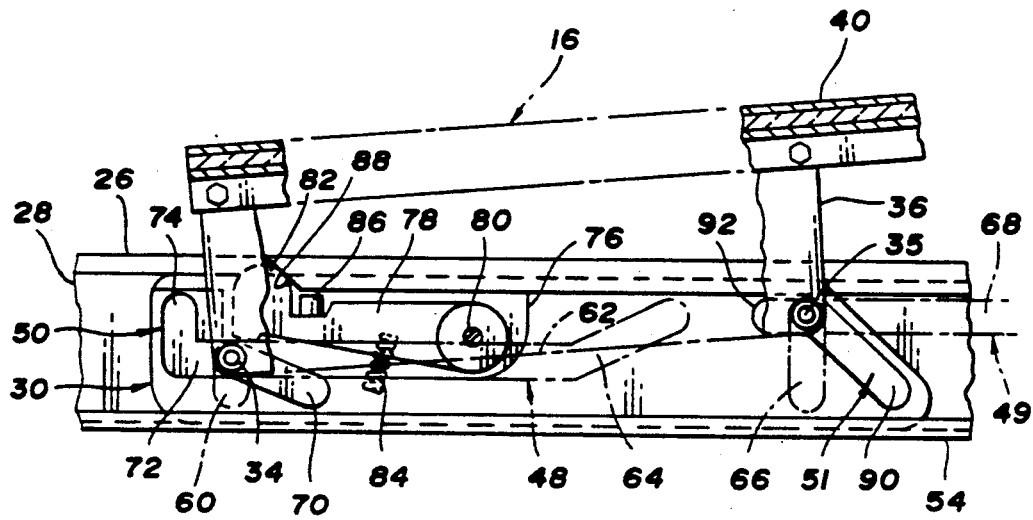
FIG. 5 is a partial side view of the control assembly of the subject invention with the sunroof panel disposed in the tilted open position.

To move the sunroof 16 to its tilted open position 20, a force is imparted to drive the drive member 30 through the stiff helical cable 52 to move the drive member 30 along the channel of the guide path 28 as shown in FIG. 5. As this occurs, the cam following pin 34 is moved up the riser slot portion 70 of the drive slot 50 which, in turn, drives the cam following pin 34 vertically upward relative to the channel in the vertical slot portion 60 of the orientating slot 48. At the same time, the cam following pin 35 is moved up the elevator slot-portion 90 of the drive slot 51 which, in turn, drives the cam following pin 35 vertically upward relative to the channel in the vertical slot portion 66 of the orientating slot 49. However, the cam follower 35 is displaced in the vertical direction a greater distance then the cam follower 34. More specifically, the control arm 36 and thus the sunroof panel 40 are moved solely in the vertical direction with respect to the fixed guide means 26. The cam follower 34 is moved approximately 6 millimeters in the vertical direction while the cam follower 35 is moved 15 millimeters in the vertical direction. No horizontal movement of the sunroof panel takes place. Accordingly, the sunroof panel 40 attains a slanted attitude relative to the roof 12 of the vehicle 10 and forms a spoiler. Further, the position of the sunroof panel is dictated by the position of the cam following pin 34, 35 relative to the orientating slots 48, 49.

As the drive member 30 is moved further along the channel formed by the guide path 28, the cam following pins 34, 35 are moved to the terminal ends of the land slot portions 72 of the drive slot 50 and the land slot portion 92 of the drive slot 51 respectively. Further, the head 82 of the stop member 78 is moved downwardly against the biasing force of the spring 84 by the abutment surface 88 to block the return of the cam following pin 34 back down the riser slot portion 70.

The cam following pins 34, 35 remain at these positions with respect to the land slot portions 72, 92 of the drive member 30 but are movably supported along the horizontal slot portion 62 and 68, respectively, of the orientating member 32 as the drive member is moved along the channel. In this way, the opening 14 in the roof 12 is further exposed as the sunroof 40 is maintained in the spoiler attitude.

Figure 6:
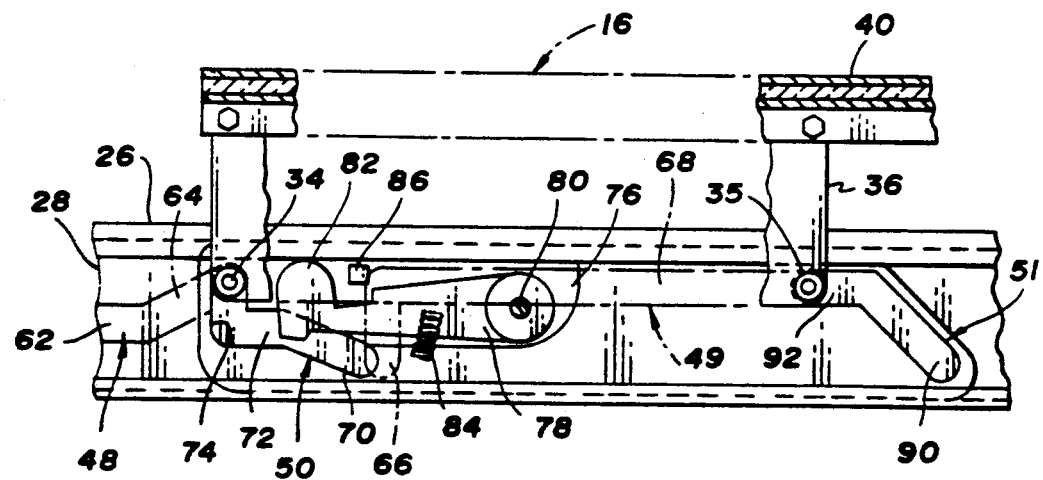
FIG. 6 is a partial side view of the control assembly of the subject invention with the sunroof panel disposed in the fully open position.

As shown in FIG. 6, when the drive member 30 has moved to a point such that the cam following pin 34 has reached the end of the horizontal slot portion 62, the pin 34 is moved upwardly along the elevating slot portion 64 of the orientating slot 48 and is driven vertically up the vertical slot portion 74 of the drive slot 50 until the sunroof panel 40 is substantially parallel to the roof 12 of the vehicle 10. The sunroof is now in the fully open position.

To move the sunroof panel 40 from the open position to the closed position, an opposite force is imparted to the drive member 30 through the stiff helical coil 52 to move the drive member along the channel. The cam following pins 34, 35 will follow the same paths, but in the opposite direction. However, it should be noted that the pin 34 is not permitted to move down the riser slot portions 70 until the head 82 of the step member 78 has passed the abutting surface 88. In this way, the head 82 is biased out of the riser slot portion 70 allowing the pin 34 to move down this slot in the drive member 30.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that within the scope of the appended claims the invention may be practiced otherwise than as specifically described.

What I claim is:

1. A control assembly for operatively moving a sunroof panel between at least two predetermined positions, said assembly comprising:

a sunroof panel;

a guide means for establishing a predetermined guide path;

a drive means slideably moveable along said guide path and movable between predetermined positions;

a panel orientating means fixedly disposed with respect to said guide means for establishing the orientation of said sunroof panel;

an integral control arm operatively connected to and supporting said sunroof panel;

said orientating means including a pair of orientating slots spaced with respect to each other;

said drive means including a pair of drive cam surfaces defining a pair of drive slots spaced with respect to each other;

said control arm including a pair of cam followers operatively and fixedly secured to said control arm in spaced relationship with respect to each other; and said cam followers being respectively slideably and movably supported along a respective one of said pair of orientating slots and along a respective one of said drive slots such that movement of said drive means moves said cam followers along said drive slots and drives said cam followers along said orientating slots such that the position of said cam followers with respect to said orientating slots of said orientating means defines the position of said sunroof panel for any given position of said drive means.

2. An assembly as set forth in claim 1 further characterized by said control arm being a plate like element substantially rectangular in shape so as to define a plane; said pair of cam followers including a pair of cylindrical pins, said pins extending substantially perpendicularly through said plane of said control arm at two points.

3. An assembly as set forth in claim 2 further characterized by said guide path of said guide means defining a channel having a substantially U-shaped configuration, said drive means being slideably disposed in said channel and moveable along said channel between said predetermined positions.

4. A control assembly for moving a closure panel for an opening in a roof of a vehicle between a first position in which an opening of the roof is closed and a second position in which the panel is displaced from the opening, said control assembly comprising:

drive means moveable between predetermined positions and having means defining a pair of longitudinally spaced apart drive cam surfaces;

orientating means for guiding said panel during movement between said positions and including means defining a pair longitudinally spaced apart orientating cam surfaces; and said panel including a control arm having first and second cam following means fixedly secured thereon in longitudinally spaced relationship with respect to each other, said cam following means being slidably moveable along said orientating cam surfaces and slidably moveable along said drive cam surfaces such that movement of said drive means relative to said orientating means moves said closure panel between said first and second positions.

* * * * *